April 1, 1958

F. A. CAMPBELL 2,828,546

HOLE AND SLOT GAUGE

Filed Feb. 21, 1955

Floyd A. Campbell
INVENTOR.

BY *[signature]*
Attorneys

United States Patent Office 2,828,546
Patented Apr. 1, 1958

2,828,546

HOLE AND SLOT GAUGE

Floyd A. Campbell, Springfield, Ohio

Application February 21, 1955, Serial No. 489,371

4 Claims. (Cl. 33—143)

This invention generally relates to a hole and slot gauge, and more specifically provides an improved and simplified form of the invention illustrated in my copending application, Serial No. 392,941, filed November 18, 1953 for Hole and Slot Gauge.

An object of the present invention is to provide an improved hole and slot gauge having a pair of pointers for indicating the width or depth of slots and the interior diameters of apertures or holes.

Another object of the present invention is to provide a hole and slot gauge having improved and novel spring means for frictionally retaining the indicating pointers in longitudinally and angularly adjusted relation.

Still other important objects of the present invention will reside in its simplicity of construction, ease of manipulation, versatile utility, adaptation for its particular purpose, and its relatively inexpensive manufacturing cost.

These together with other objects and advantages which will become subsequently apparent reside in the details of construction and operation as more fully hereinafter described and claimed, referenec being had to the accompanying drawings forming a part hereof, wherein like numerals refer to like parts throughout, and in which:

Figure 1:
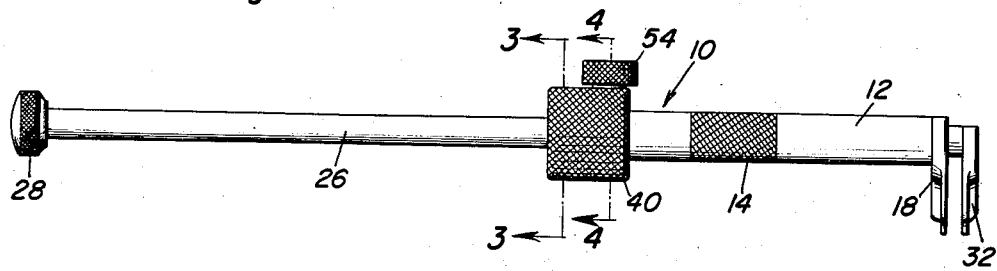
Figure 1 is a side elevational view of the hole and slot gauge of the present invention.
Figure 4:
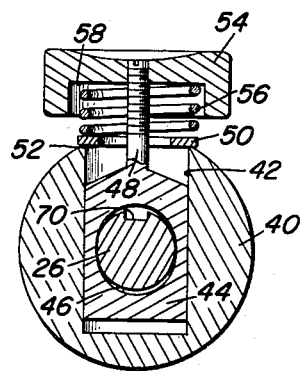
Figure 5:
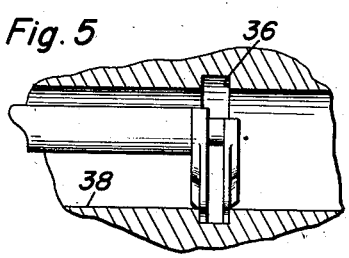

Figure 4 is a transverse, vertical sectional view taken substantially upon a plane passing along section line 4—4 of Figure 1 showing the construction of the laterally movable collar for frictionally engaging around the longitudinally slidable rod for frictionally adjusting the rod; and Figure 5 is an enlarged view showing the hole and slot gauge of the present invention for use in measuring the length of a counterbore.

Referring now specifically to the drawings, it will be seen that the numeral 10 generally designates the hole and slot gauge of the present invention including a generally elongated tubular sleeve 12 having a knurled hand grip 14 on the surface thereof and provided with a reduced externally threaded portion 16 at one end. A marker or pointer 18 is provided with an internal screw threaded portion for positioning the pointer 18 on the end of the sleeve 12. The pointer 18 is provided with a projecting point 20 for engagement with one side of an aperture 22 in a pipe 24 or the like.

Slidably received within the tubular sleeve 12 is an elongated rod member 26 having a knurled knob 28 on one end thereof which acts as a handle, and the other end thereof is provided with a longitudinally projecting screw threaded stud 30 for receiving the threaded end of a pointer 32 having a pointed end portion 34 which is normally disposed in opposition to the pointed end 20 of the pointer 18 whereby the diameter of the aperture 22 in the pipe 24 may be measured. As illustrated in Figure 5, the length of the counterbore 36 may be measured by inserting the hole and slot gauge 10 into the bore 38 in an obvious manner.

Disposed at the end of the sleeve 12 remote from the pointer 18 is an enlarged portion 40 having a transverse bore 42 therein for slidably receiving a collar 44 which is provided with an oval-shaped opening 46 for surrounding the rod 26. The collar 44 is provided with a reduced and externally threaded shank 48 projecting laterally from the enlarged portion 40 through the opening or bore 42. An annular ring or washer 50 forms generally a closure for the bore 42 and is provided with a central aperture 52 for receiving the screw threaded shank 48. A cap nut 54 is in engagement with the screw threaded shank 48 for threading onto and off the shank 48 and a coil compression spring 56 is disposed in surrounding relation to the shank 48 between the cap 54 and the annular ring or washer 50, wherein the cap 54 is provided with an undercut recessed portion 58 for forming a guide for the compression coil spring 56. It will be seen that by manipulation of the thumb cap or screw 54, the spring 56 may be tensioned, thereby moving the collar 44 transversely or laterally of the rod 26, thereby frictionally engaging the rod 26 and locking the rod 26 in longitudinal adjusted relation in relation to the sleeve 12. By not completely tightening the nut 54, the frictional pressure engaging the rod 26 may be released by merely pushing downwardly on the cap 54 by use of the thumb or the like. It will be seen that the spring 56 together with the cap 54 provides means for quickly permitting adjustment of the pointers 18 and 32 and frictionally retaining this adjusted position.

The enlarged portion 40 is provided with a wall portion 60 which includes an aperture closely surrounding the rod 26 and a bore 62 is provided which includes a counterbore 64 receiving an annular retaining ring 66 therein which is in the form of a washer having an enlarged opening 68 for slidably receiving the rod 26. The rod 26 is provided with a longitudinal groove 70 in the peripheral surface thereof for slidably receiving the detent end 72 of a slidable plunger 74 mounted in a radial bore 76 in an annular ring or washer 78 which is positioned against the inner surface of the retaining ring 66. A compression coil spring 80 is provided within the tubular sleeve 74 for urging the detent end 72 into engagement with the groove 70 in the rod 26, and the other end of the spring 80 bears against the inner surface of the bore 62. A compression coil spring 82 is positioned in surrounding relation to the rod 26 and abuts against the wall 60 and the inner surface of the annular ring 78 for resiliently urging the ring 78 against the surface of the retaining ring 66, thereby frictionally retaining the washer or ring 78 in adjusted angular relation in respect to the enlarged portion 40 and the wall 60, whereby the rod 26 may be retained in adjusted angular relation in respect to the sleeve 12 by positioning of the detent 72 in the groove 70, whereby the angular relation of the pointers 18 and 32 may be adjusted, as desired.

It will be understood that the outer surface of the cap 54 is knurled as is the outer surface of the enlarged portion 40 for permitting a better grip on the hole and slot gauge of the present invention.

Figure 2:
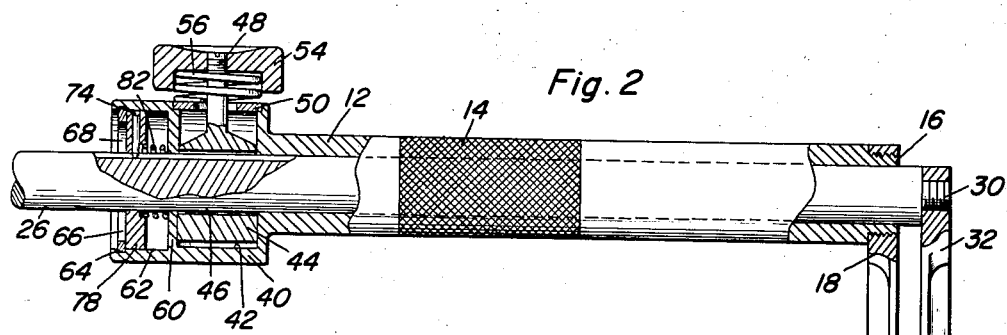
Figure 2 is a detailed view similar to Figure 1 with portions thereof being sectioned showing the details of the adjusting means for the pointer.
Figure 3:
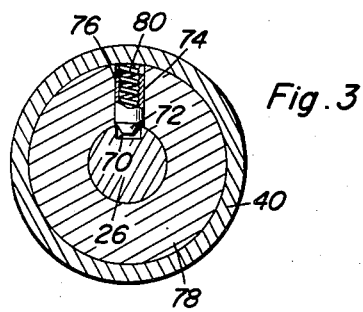
Figure 3 is a transverse, vertical sectional view taken substantially upon a plane passing along section line 3—3 of Figure 1 showing the construction of the spring urged detent for frictionally retaining the pointers in angularly adjusted position.

In practical use of the present invention, the pointers 18 and 32 are brought into alignment by bringing the detent 72 into engagement with the groove 70 wherein the spring 82 will permit relative angular movement of the pointers 18 and 32 until they are aligned or are in desired positions. The ends 20 and 34 of the pointers 18 and 32 may then be positioned in an aperture 22 in the case of Figure 2 or in a counterbore 36 in the case of Figure 5, and the rod 26 moved relative to the sleeve 12 for moving the pointers 18 and 32 away or towards each other by merely depressing the cap 54, thereby compressing the spring 56 and releasing the collar 44 from frictional engagement with the rod 26, whereupon the rod 26 may be moved longitudinally as desired. When the desired measurement has been made, the cap 54 may be released, whereby the spring 56 will retain the sleeve 12 and rod 26 in adjusted longitudinal position thereby retaining the pointers 18 and 32 in a desired position so that the measurement taken thereby may be utilized for any desired purpose. If desirable, the cap 54 may be securely tightened, thereby securely locking the rod 26 in relation to the sleeve 12 thereby preventing relative longitudinal or angular movement therebetween.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the appended claims.

What is claimed as new is as follows:

1. A hole and slot gauge comprising a tubular sleeve having a transverse pointer at one end thereof, a rod slidably mounted in said sleeve and projecting from both ends thereof, a transverse pointer on the end of said rod adjacent the pointer on the sleeve, and means remote from the pointers for permitting adjustment of the longitudinal and angular relative positions of said pointers, said means including a transversely movable collar surrounding said rod and mounted on said sleeve, and spring means urging said collar transversely for frictionally retaining the rod and sleeve in adjusted position, said collar having a laterally extending shank, said sleeve having an enlarged portion receiving said collar and an opening therein for receiving the shank, a cap on the outer end of the shank, said spring means including a coil spring disposed between the cap and the enlarged portion in surrounding relation to the shank for retaining the sleeve and rod in longitudinally and angularly adjusted position.

2. A hole and slot gauge comprising a tubular sleeve having a transverse pointer at one end thereof, a rod slidably mounted in said sleeve and projecting from both ends thereof, a transverse pointer on the end of said rod adjacent the pointer on the sleeve, and means for permitting adjustment of the relative positions of said pointers, said means including a transversely movable collar surrounding said rod and mounted on said sleeve, and spring means urging said collar transversely for frictionally retaining the rod and sleeve in adjusted position, said collar having a laterally extending screw threaded shank, a cap on the outer end of the shank, said sleeve having an enlarged portion receiving said collar and an opening therein for receiving the shank, said spring means including a coil spring disposed between the cap and the enlarged portion in surrounding relation to the shank for frictionally retaining the sleeve and rod in longitudinally adjusted position, said rod including a longitudinal groove therein, said sleeve having a spring urged detent for engagement with said groove, an annular ring rotatably mounting the detent on said sleeve, and spring means frictionally holding said annular ring in position thereby frictionally retaining the rod and sleeve in angularly adjusted relation, said cap adapted to be tightened for positively locking the pointers in adjusted position.

3. A hole and slot gauge comprising an elongated tubular sleeve having a transverse pointer at one end, an elongated rod having a transverse pointer at one end adjacent the pointer on the sleeve, said rod extending from both ends of the sleeve and being slidably and rotatably supported therein, means at the other end of the sleeve frictionally retaining and positively locking the sleeve and rod in longitudinally and angularly adjusted position, said means including an enlarged tubular end portion on the sleeve, a transversely movable collar mounted in said end portion in encircling relation to the rod, a laterally extending shank on said collar extending through the end portion, a cap adjustably mounted on the outer end of the shank, a coil spring disposed between the cap and the periphery of the end portion for resiliently urging the collar into frictional engagement with the rod thus retaining the rod in adjusted position, inward movement of the cap on the shank causing compression of the coil spring thereby positively locking the collar to the rod for locking the rod and sleeve in adjusted position, inward movement of the cap with the shank releasing the collar from the rod for permitting free movement of the rod in relation to the sleeve.

4. The combination of claim 3 wherein said means also includes an annular ring rotatably mounted in said end portion in encircling relation to the rod, a coil spring encircling the rod in abutting relation to the ring, an inwardly extending flange on the free end of the end portion for retaining the ring therein whereby the longitudinal spring will resiliently resist rotation of the ring, said rod having a longitudinal groove therein, a spring urged detent mounted radially in said ring and received in said groove thereby frictionally retaining the rod and sleeve in adjusted position before positive locking in the adjusted position.

References Cited in the file of this patent

UNITED STATES PATENTS

| | | |
|---|---|---|
| 695,661 | Theibault | Mar. 18, 1902 |
| 1,321,312 | Jooss | Nov. 11, 1919 |

FOREIGN PATENTS

| | | |
|---|---|---|
| 27,802 | Great Britain | Dec. 3, 1913 |
| 74,141 | Switzerland | Jan. 16, 1917 |